Oct. 20, 1970          S. CIRAMI          3,535,513
GERMICIDAL LAMP APPLIANCE FOR STERILIZING THE WATER IN
AQUARIUMS OR SWIMMING POOLS
Filed Feb. 16, 1967          11 Sheets-Sheet 1
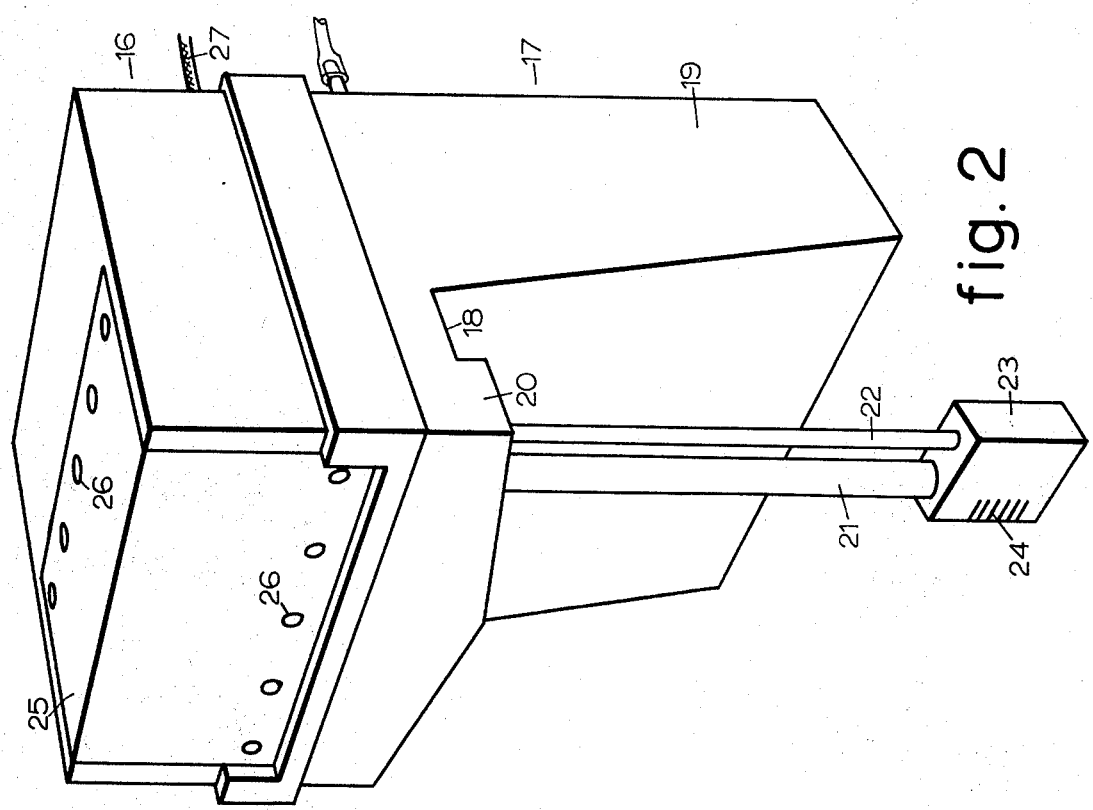
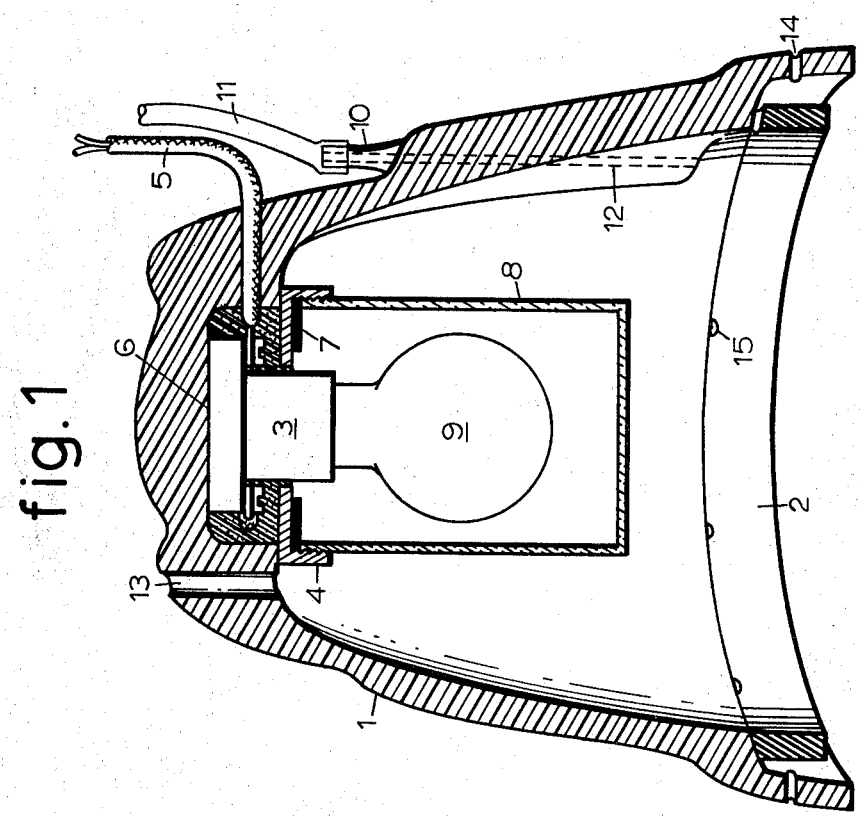
inventor
*Salvatore Cirami*

Oct. 20, 1970  S. CIRAMI  3,535,513
GERMICIDAL LAMP APPLIANCE FOR STERILIZING THE WATER IN
AQUARIUMS OR SWIMMING POOLS
Filed Feb. 16, 1967  11 Sheets-Sheet 3

Oct. 20, 1970   S. CIRAMI   3,535,513
GERMICIDAL LAMP APPLIANCE FOR STERILIZING THE WATER IN
AQUARIUMS OR SWIMMING POOLS
Filed Feb. 16, 1967   11 Sheets-Sheet 7

Oct. 20, 1970 S. CIRAMI 3,535,513
GERMICIDAL LAMP APPLIANCE FOR STERILIZING THE WATER IN
AQUARIUMS OR SWIMMING POOLS
Filed Feb. 16, 1967 11 Sheets-Sheet 10

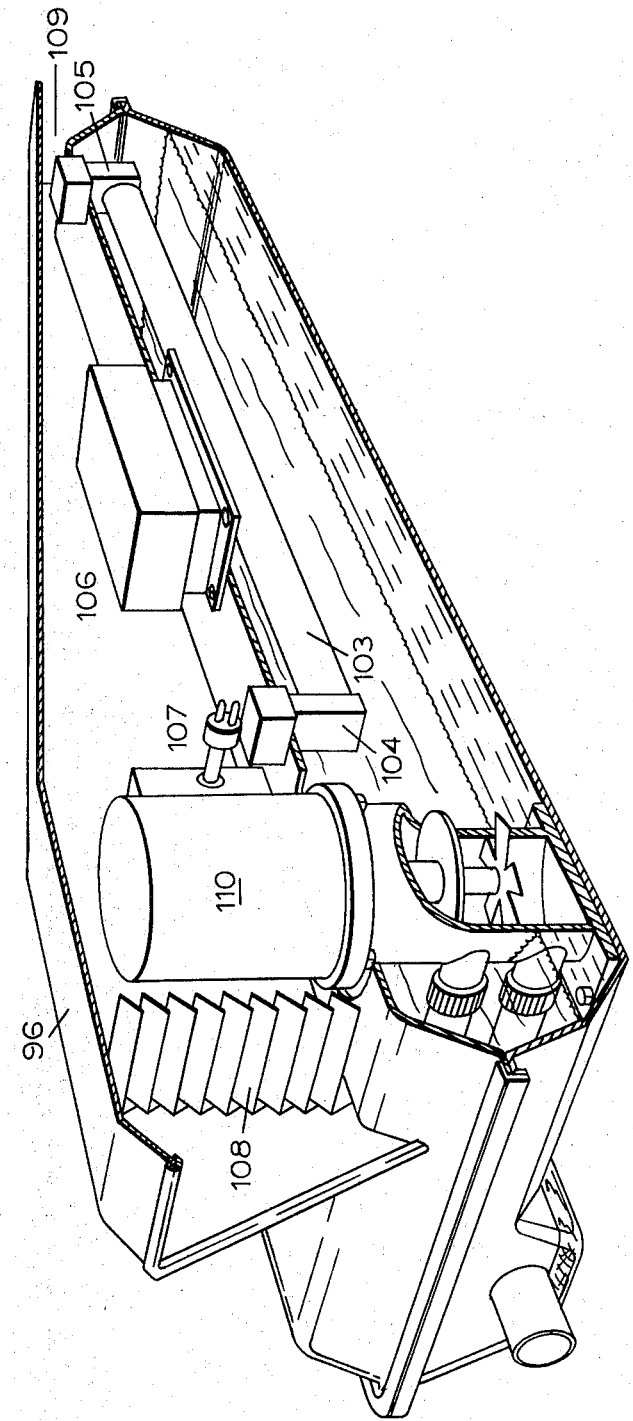

United States Patent Office 3,535,513
Patented Oct. 20, 1970

---

3,535,513
GERMICIDAL LAMP APPLIANCE FOR STERILIZING THE WATER IN AQUARIUMS OR SWIMMING POOLS
Salvatore Cirami, 41—13 Vernon Blvd.,
Long Island City, N.Y. 11101
Filed Feb. 16, 1967, Ser. No. 616,683
Int. Cl. G01n *21/26*
U.S. Cl. 250—43          7 Claims

ABSTRACT OF THE DISCLOSURE

Germicidal lamp appliances are disclosed for sterilizing the water in aquariums or swimming pools with ultraviolet light. Various embodiments are shown for mounting said appliance for operation outside of the water or completely submerged for operation within the water. The appliances in all embodiments are compact and portable.

---

This invention relates to aquarium, outdoor fish breeding pond and swimming pool germicidal lamp applicances and more particularly to improvements in and additions to devices of this nature which were first described in my application filed Aug 15, 1966, Ser. No. 572,559 titled: "Aquarium Germicidal Lamp Applicance," which is now abandoned.

FIG. 1 is a sectional plan view of a submersible type of aquarium germicidal lamp appliance designed for the situation where there is not enough space on or convenient access to the outside back side of the aquarium. This problem is especially peculiar to dealers in tropical fish who typically arrange their in-use display aquariums virtually one upon the other; but many home aquarists too prefer to minimize the number of appliances attached on the outside of their aquarium, to avoid a cluttered appearence.

FIG. 2 is a general view in perspective of an outside back mounted aquarium germicidal lamp appliance that is more efficient in performance than the comparable type shown in my earlier filed application.

FIG. 3 is a second view, also in perspective, of the FIG. 2 device. In FIG. 3 the device is shown with its upper section or cover member removed and positioned at a 90 degree angle to show its underside. The lower section, a combination of tray and deep receptacle, is shown with portions broken away to afford the best exposure of interior elements.

FIG. 4 is a perspective view with parts broken away showing a third type of aquarium germicidal lamp appliance, this one intended for location on top of the aquarium.

FIGS. 5, 6 and 7 are perspective views of three other types of germicidal lamp appliance, each of which can be used to sterilize the water in large aquariums, the device of FIG. 5 being especially useful for indoor or outdoor goldfish pools; and the device of FIG. 7 being applicable to municipal aquariums and especially for large outdoor ponds used by professionals for breeding tropical and goldfish on a large scale. In addition, they incorporate features which make them useful for use with swimming pools, and they are illustrated in this application. The drawings provide a quick grasp of the manner of use and suggest the general size of the devices.

FIG. 13 is another perspective view of the same, assembled and sectioned to show the relationship of the internal elements.

Figure 3:
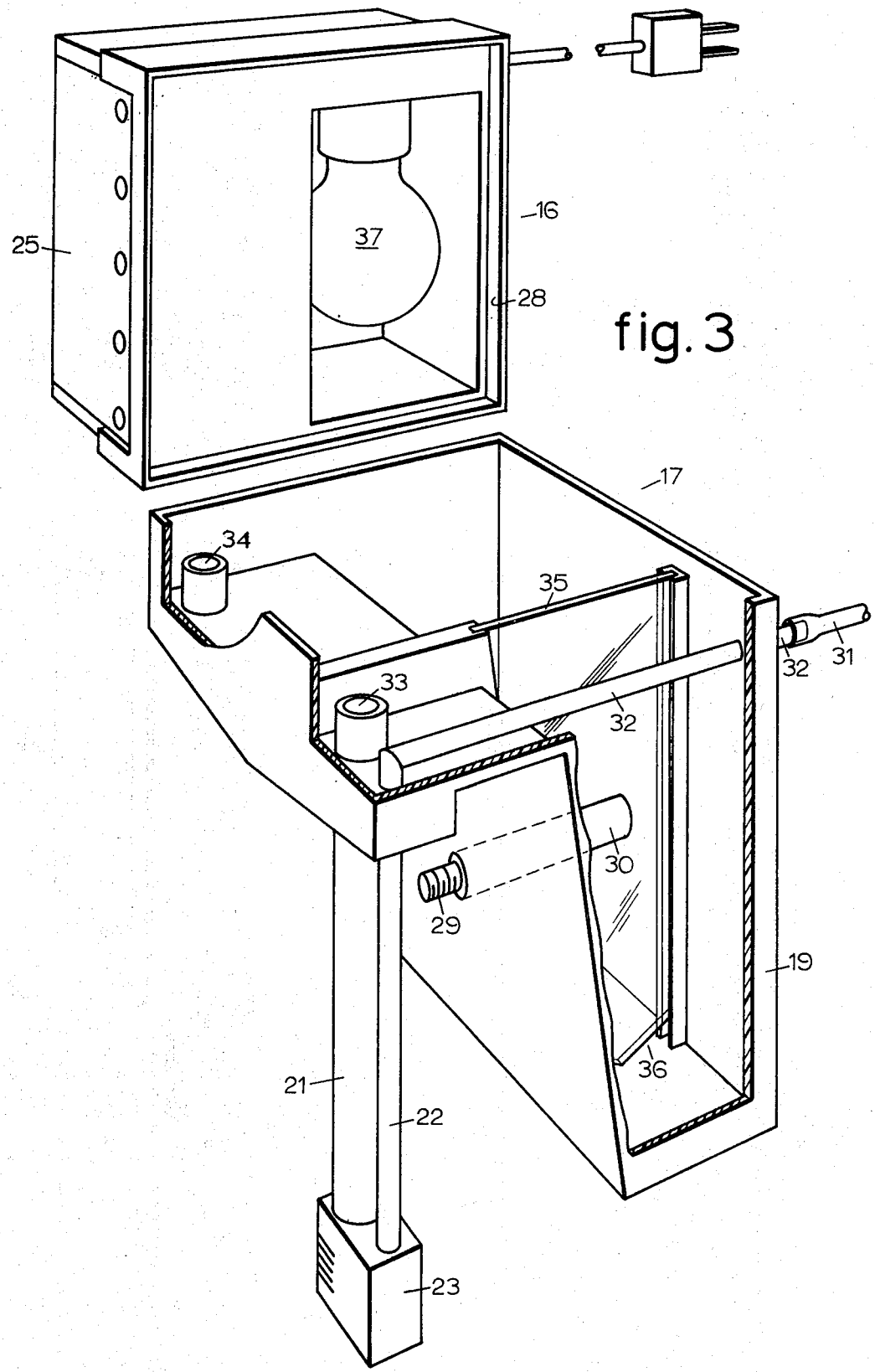

The submersible unit comprises a housing 1 made of a plastic that obstructs ultraviolet light and having a generally bell-like form, in that the housing is open-bottomed and is preferably wider at its base for improved stability. The exterior of the housing is given an irregular configuration, purely as a matter of esthetic preference, the idea being to simulate the shape of a rock so that the presence of the unit inside the aquarium will be less objectionable.

Ballast means for weighing down the housing is provided, in this instance, in the form of a ring 2, FIG. 1 made of lead and cemented to the housing by means of epoxy resin adhesive. An electrical socket 3 is cemented to the ceiling of the housing within a recess formed in same, and a plastic screw type jar cap 4 is then cemented to the ceiling; the cap having first been provided with a hole that is large enough to permit the socket to depend through the cap. In the course of assemblying the device, the electrical socket will have been provided with wires secured to its terminals, the wires being preferably brought together to form a single waterproof power cord 5 that passes through an opening in the housing. The recess in the ceiling of the housing is filled with epoxy potting resin 6 to effect a watertight seal around the terminals of the socket and the wires.

The cap 4 is provided with a rubber gasket 7 against which a transparent jar 8 is secured, water being thereby unable to enter the jar and reach the metal screw socket of the electrical base; the jar being made of a plastic or glass that is transparent to ultraviolet light emitted by the germicidal lamp 9.

The housing is so formed as to provide an externally located nipple 10 onto which an air hose 11 is fitted by the user, the housing being bored to provide an air conduit 12 that opens at the inside of the housing, the air conduit, in effffect, comprising an air release means, by means of which air bubbles are introduced into the interior of the housing. The air bubbles rise to the ceiling of the housing and find their way out of same through the water outlet conduit 13, the usefulness of the air bubbles being that they push water that is in the conduit up out of same and create a movement of water inside the housing and around the jar containing the germicidal lamp, additional water being then drawn in through water inlet openings in the housing near its base, as at 14. Additional openings 15 are provided between the ballast ring and the housing to insure free entry of water and these openings are so placed as to minimize the projection of ultraviolet light through both the openings 15 and the openings 14—for the protection of the fishes in the aquarium.

The germicidal lamp requires the use of an electrical ballast and it is here intended that said ballast will be located in a separate housing that is hung on the frame of the aquarium on the outside of same, the power cord 5 leading up out of the water and connecting with the electrical ballast, the ballast being provided with another power cord having a plug for connection with a wall receptacle. The electrical ballast is not included in the design of the submersible unit because it generates quite a bit of heat and this may cause overheating of the aquarium. The submersible unit is intended to stand either on the bare floor of an aquarium in which no gravel is used, or pressed slightly into the gravel covering the floor of a decorated aquarium. In either case, it is necessary that sufficient water be maintained in the aquarium to fully submerge the unit.

Specific details of the construction will of course vary depending on the particular method of manufacture. For example, instead of casting the housing using liquid resin, the cost of production may be lowered by using the vacuum forming method applied to heated rigid sheet acrylic plastic.

Following this latter method, the socket 3 is provided with the wires secured to its terminals as shown in FIG. 1, then cemented to the jar cap 4, fitting snugly in the hole in the cap for temporary support until the cement hardens, and then the socket and jar cap assembly together are fixed to the ceiling of the housing by applying epoxy cement between the socket and the ceiling of the housing.

The walls of the housing will have an approximately uniform thickness, i.e., the inside shape of the housing will necessarily follow the outside shape, therefore there is no specific recess 6 in this alternative embodiment. But a space will be left between the ceiling of the housing and the jar cap, around the socket and terminal wires.

To provide air release means equivalent to conduit 13, FIG. 1 together with conduit 12 and nipple 10, the relatively thin walled vacuum formed housing is bored vertically similarly as to effect conduit 13, and the opening is fitted with a length of tubing that depends into the housing far enough to terminate at a level equal to that of the rim of the jar cap. A second hole is bored in the housing, this one horizontally, the drill bit cutting also into the vertical tube; the second hole is then fitted with a tube of small diameter equivalent to the nipple 10 and terminating in the wall of the vertical tube in the hole bored in same. The vertical tube may extend upwardly an inch or two above the housing to provide a more efficient bubble-up action.

The housing is then held in inverted position and the space described between the ceiling and jar cap is filled with a mixture of epoxy resin and aquarium gravel to the level of the rim of the jar cap. The epoxy resin provides a waterproof seal around the socket terminals and secures the vertical and horizontal tubes in place, and the gravel provides sufficient ballast to eliminate the need for an additional ballast ring 2, FIG. 1.

The type shown in FIGS. 2 and 3 consists of an upper section 16 containing the germicidal lamp and the electrical ballast which the lamp requires, and a lower section 17 through which water from the aquarium is circulated in exposed relation to the ultraviolet light of the lamp.

The lower section 17 has a hook-like shape that enables it to be hung on the frame of an aquarium, i.e., with the edge 18 resting on the frame of the aquarium and the deep portion 19 hanging outboard adjacent the rear side of the aquarium, and the portion 20 located inboard of the aquarium, most frequently, just above the level of the water in the aquarium. In this position, the tubes 21, 22 depend well into the water, 22 being an air conduit for conveying air under pressure for release into the water lift tube 21; the place of cross-over or connection between the two being made in the coupling 22 which is provided with several saw cuts 24 to permit water to enter the water lift tube 21 while excluding the entry of fish.

The upper section is divided internally into two compartments: a rearward located compartment containing the germicidal lamp and which opens into the lower section 17; and a forward located compartment which is closed off from the lower section and which contains the electrical ballast device. The ballast compartment is provided with a metal grills 25 that covers its upper and forward side, and this grille is provided with openings 26 to facilitate dissipation of the heat generated by the ballast.

The power cord 27 for the lamp and ballast is brought out at the rear of the upper section and is of course provided with a plug for connection with a wall receptacle.

In the embodiment illustrated, the upper section is provided with a depending skirt 28 that overlaps the walls of the lower section 17, to provide a means of positioning the two sections with respect to each other and to decrease the likelihood of light projecting externally of the unit itself.

To use the appliance the unit is positioned on the aquarium as has been described and adjusted to a level position by means of an adjustment screw 29, FIG. 3 that is threaded within a sleeve 30 that passes completely through the lower section 17 extending rearwardly of same a sufficient distance for provision of a knurled head for convenience in grasping the screw for turning same. The sleeve 30 insures the watertight integrity of the lower section. An air hose 31 is then fitted onto the tube 32 which makes connection as shown with the air conduit 22 resulting in the bubbling up of water in tube 21, the water exiting at 33 and eventually filling the receptacle until the water reaches the level of the riser tube 34, whereupon the water spills over same and pours back into the aquarium, the riser tube being open at its lower end to effect same. To insure optimum circulation when the receptacle is filled, a partition is provided having a removable portion 35—for ease of cleaning the lower section 19. The member 35 is cut at an angle at its lower end to leave an opening 36 through which the water can pass. Also, it is made of a plastic that is transparent to ultraviolet light so as to insure the maximum exposure of the water contained in section 19.

The up-ended position of the upper section 16, FIG. 3 reveals the germicidal lamp 37 and the depending skirt 28 with which the upper section is provided.

It is apparent that when the upper section is placed in position on the lower section as shown in FIG. 2, the water in the receptacle is exposed in an efficient manner. In effect, the device is a tray combined with a deep receptacle. The tray portion affords exposure of the water over a large surface area, and the deep lower section 19, by maximizing the water capacity or volume of water contained at any given time, insures that the water pumped into the receptacle will circulate slowly enough through the unit to insure the most effective destruction of any germs in the water.

Figure 4:
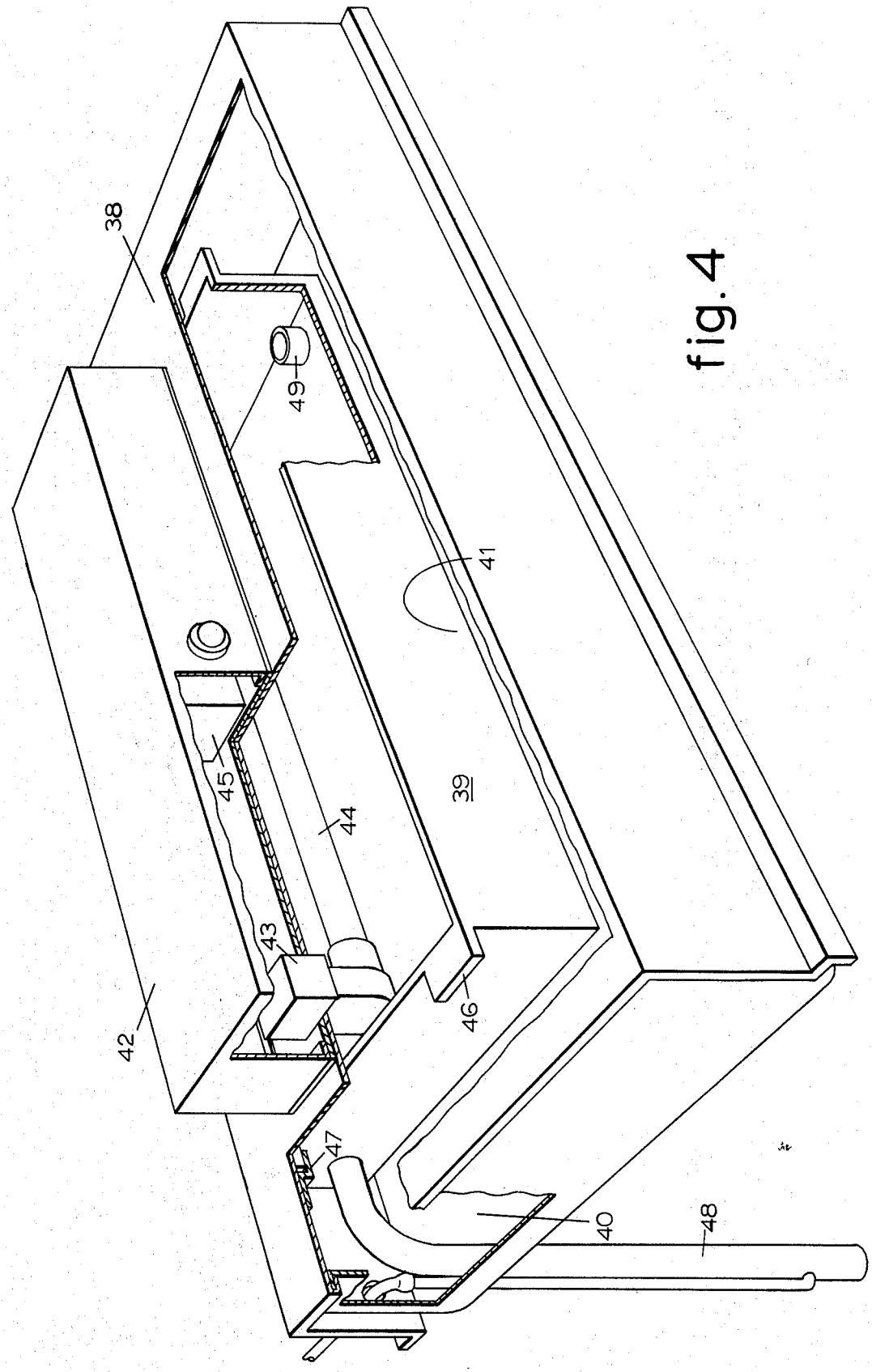

The type shown in FIG. 4 comprises a support structure 38 that is adapted to rest upon and engage the top edges of the frame or walls of an aquarium and provide support for a tray member 39 that depends from the support structure.

In my earlier filed application, a tray type of germicidal lamp appliance is shown which is provided with its own support members that extend directly from the ends of the tray to the frame of the aquarium. In the present embodiment, the tray is so proportioned that it terminates sufficiently short of the frame of the aquarium that clearance is provided adjacent the narrow ends of the tray, for example at 40, and adjacent a long side of the tray, for example at 41, that conventional incandescent or fluorescent lamps can be installed for illuminating the interior of the aquarium. In other words, the support structure 38 is actually what is popularly called a reflector, differing in external appearance from a conventional reflector only by the addition of a superstructure 42 which encloses the electrical base elements—one of which is shown at 43— that support and power the tubular-shaped fluorescent type of germicidal lamp 44, and the necessary electrical ballast device 45.

The invention conceived is not that of any aggregation between a germicidal lamp appliance and the familiar decorative lighting reflector, but is instead restricted to the idea of a tray type of germicidal lamp device that is supported indirectly, through the medium of a reflector; to achieve the benefit that the appliance presents as nearly as possible the external appearance of a conventional reflector, and therefore should more readily find immediate acceptance with the home aquarist.

A further characterizing idea is that of providing the tray in sufficiently smaller dimensions than those of the reflector as to leave clearance on one of more side for optional installation of the lighting lamps to which reference has been made.

The non-obvious unitary result achieved by the fullest expression of the invention is that a germicidal lamp appliance is provided that not only does not conflict with the space requirements of decorative lighting or other equipment mounted on the back of the aquarium or decorative materials arranged inside the aquarium, but instead is so conceived that decorative lighting can be incorporated within the unitary structure of the appliance in such manner as to present a unitary, simple, almost conventional external appearance, while at the same time enclosing practically all of the top of the aquarium so as to provide a dust cover.

In the present embodiment, the tray 39 is provided with small flanges as at 46 that engage the fingers as at 47 to attain the desired supported relationship between the reflector and the tray; the arrangement being such that the upper edges of the tray close fully against the underside of the reflector to avoid undesirable spillage of ultraviolet light, and the tray is made of a material that does not pass ultraviolet light.

Water is pumped up into the tray from the aquarium by means of a conventional air bubble device 48 which is long enough to depend well below the surface of the water in the aquarium. The water then fills the tray to a shallow depth as determined by the height of the riser tube 49, overflowing same and spilling back into the aquarium.

Figure 5:
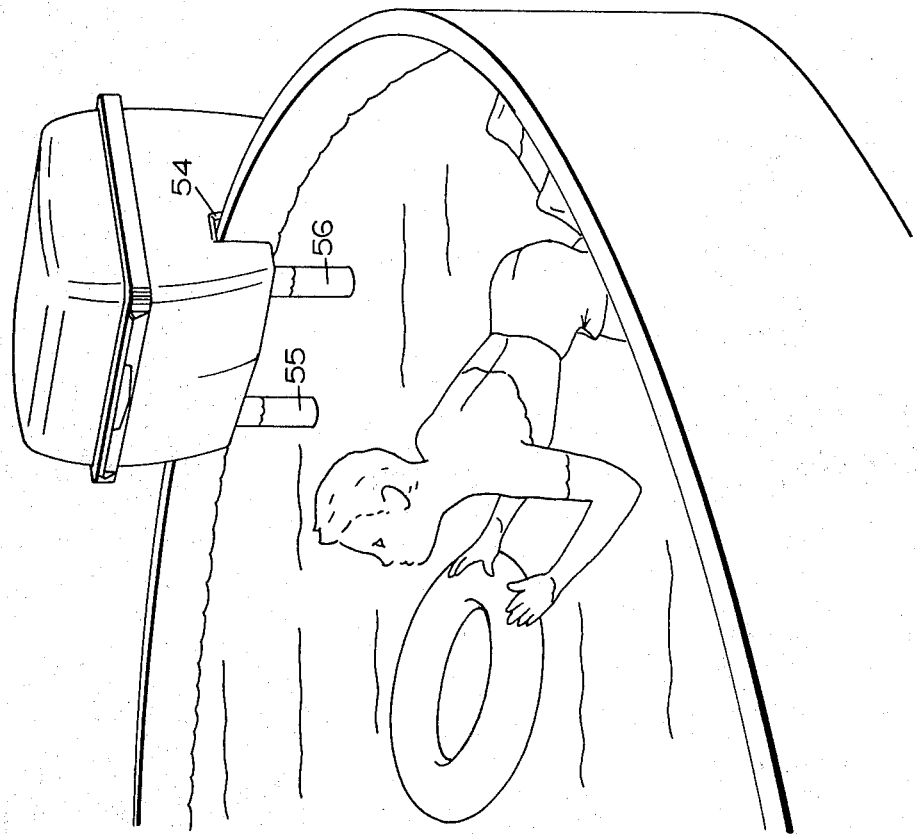

The device shown in FIG. 5 comprises essentially a housing indicated generally as 50 to the upper side of which leads a waterproof electrical power cord 51 from a source not shown. At one end of the housing is connected a length of ordinary plastic garden hose 52 the free end of which is fitted with a strainer 53.

The device is shown installed in a child's backyard wading pool, the figure representing the typical design of these pools, having a circular shape, made entirely of plastic and having pneumatic walls divided into a tubular configuration.

The housing 50 encloses a water pump and an ultraviolet lamp and is operated fully submerged in the pool. The garden hose provides an inexpensive filter means: the hose is filled with aquarium gravel, filtering being by bacterial action similar to the sub-gravel filters presently being used in aquariums.

Figure 6:
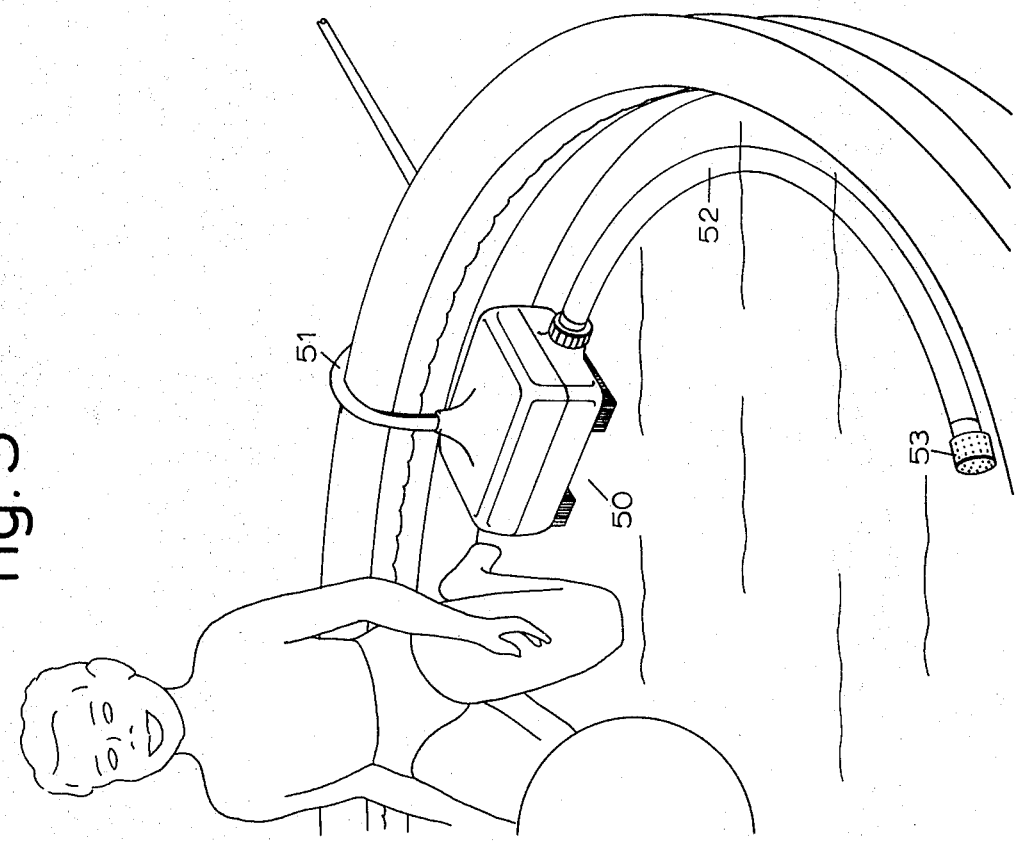

As the illustration suggests, the type shown in FIG. 5 is intended for small pools; the type shown in FIG. 6 is intended for larger pools having a wall structure properly shaped and rigid enough that a clamped-on mounting can be attained. In use, the FIG. 6 type is clamped onto the rigid wall of the pool, as at 54, with the two tubes 55, 56 depending into the water. Water from the pool is pumped up into the unit through tube 55 by means of a waterpump located inside the unit, is exposed to strong ultraviolet lamps, and spills back into the pool through tube 56.

Figure 7:
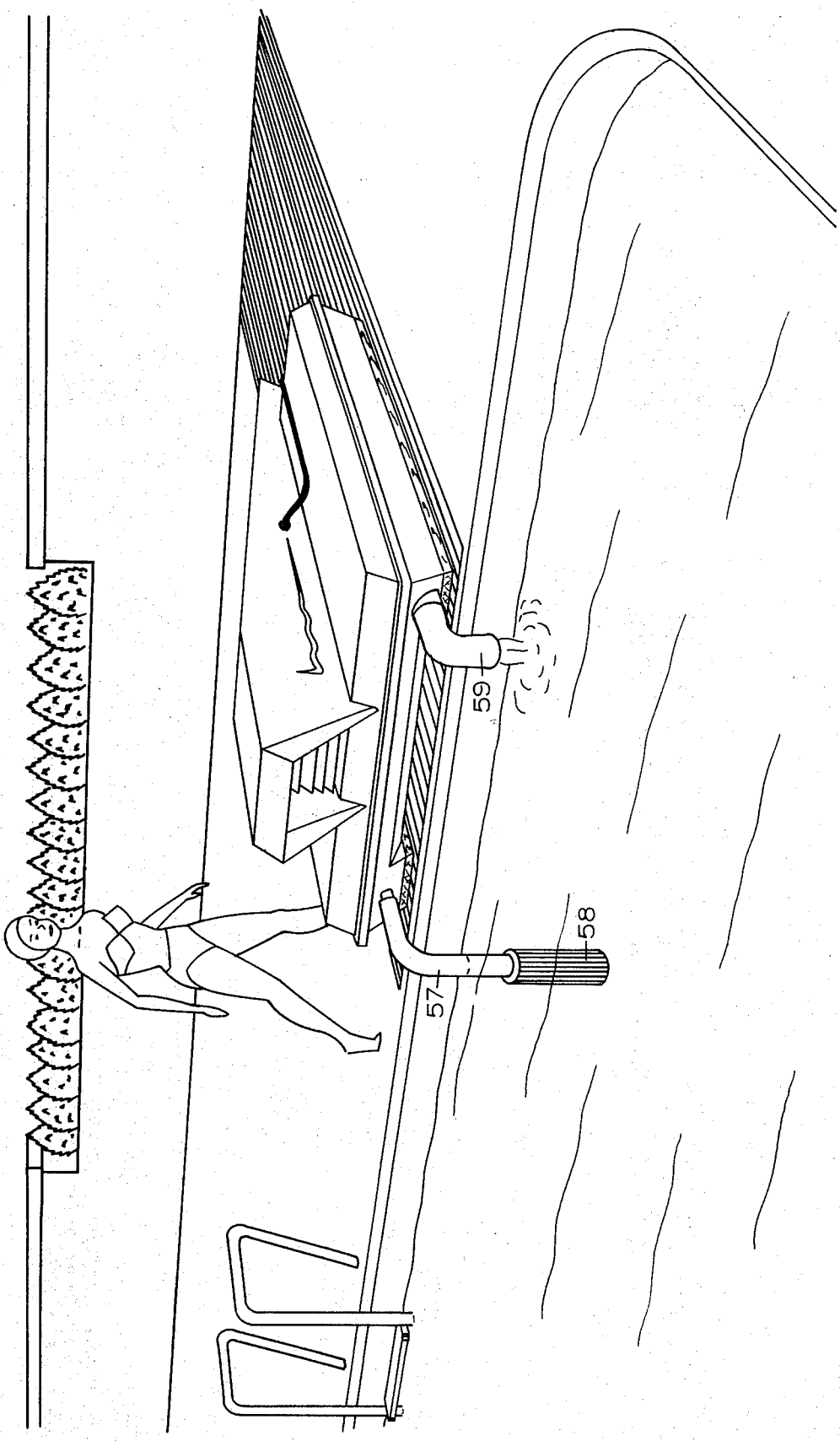

For the largest pools the type shown in FIG. 7 is the answer. The operating principle is essentially the same as the FIG. 6 type: water is pumped up into the unit through the inlet conduit 57 equipped with strainer 58, exposed to intense ultraviolet light, and thereafter allowed to spill back into the pool through the outlet conduit 59.

Figure 8:
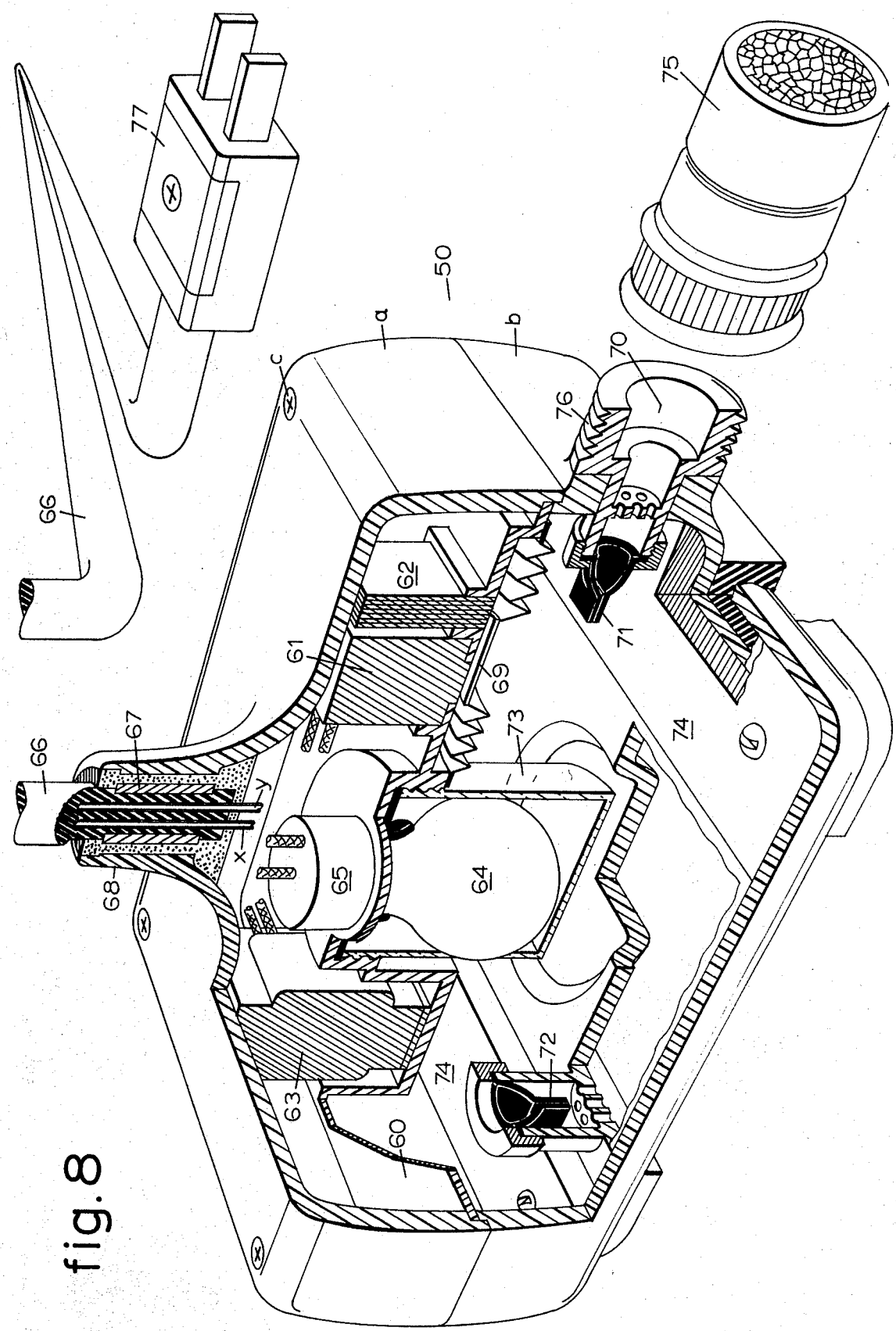
FIG. 8 is an enlarged perspective view of the device of FIG. 5, showing parts broken afay and in exploded relationship.

Turning now to FIG. 8 where the appliance of FIG. 5 is shown enlarged and cut away to show the interior, the unit is seen as comprising a housing, indicated generally as 50, which is divided into an upper section *a* and a lower section *b*, fastened together with extra long screws, as indicated at *c*, that pass through the upper half and are threaded in the lower half.

The upper half *a* is provided with a floor member 60 that is permanently cemented to the upper half in a watertight manner. Secured to the floor member prior to its installation are two of the components of a vibrator pump, specifically an electromagnet 61 together with cooperating laminated iron core 62. Also cemented in place prior to sealing the floor member is an electrical ballast 63 for the germicidal lamp 64. The floor member 60 is so constructed as to provide a socket within the cylindrically shaped structure 65 for receipt of the lamp. From the ballast 63, socket structure 65 and electromagnet 61 emerge lead wires, as indicated by the cross-hatching. These are connected together with the main power wires *x* and *y* prior to sealing the floor member against the upper half of the housing.

The main power wires are encased in a thermoplastic waterproof insulating cable 66, on which has been fitted a heated metal collar 67 that upon cooling "chokes" the cable, thereby securing a sure mechanical grip between the collar and the cable. Epoxy resin is then poured into the space between the cable and the raised portion 68 of the housing; the resin being enabled to lock the cable in place in a foolproof manner because of the stepped and undercut form of the interior of the raised portion 68, and also because of the excellent bonding surface presented by the metal collar.

The electromagnet pulse laminated core or bar combination, powered by sixty cycle alternating current sets up a varying magnetic field that causes the concentrically convoluted diaphragm 69 to move up and down, thereby alternately increasing and decreasing the displacement of the interior of the lower half *b* of the housing. Each time the displacement is increased water is drawn in through the inlet opening 70 which is provided with a simple rubber valve 71 that opens to allow water to enter the housing, but closes promptly when the internal water pressure becomes greater than the external water pressure. Each time the displacement is decreased, the greater internal pressure forces some of the water out through the rubber valve 72, so that in effect, water is continuously being pumped through the lower section of the housing and especially around the transparent jar 73 that encloses the lamp.

Ballast for weighting the unit is provided in the form of two bars of lead 74, 74 which are bolted to the floor of the lower section.

The garden hose 75 is an extra optional feature which, in use, is screwed onto the threads 76 on the water inlet assembly.

To provide maximum safety the power cord is provided with that type of plug having a fuse in series with each wire *x* and *y* of the power supply circuit. The fuses are accessible through the cover member 77.

Figure 9:
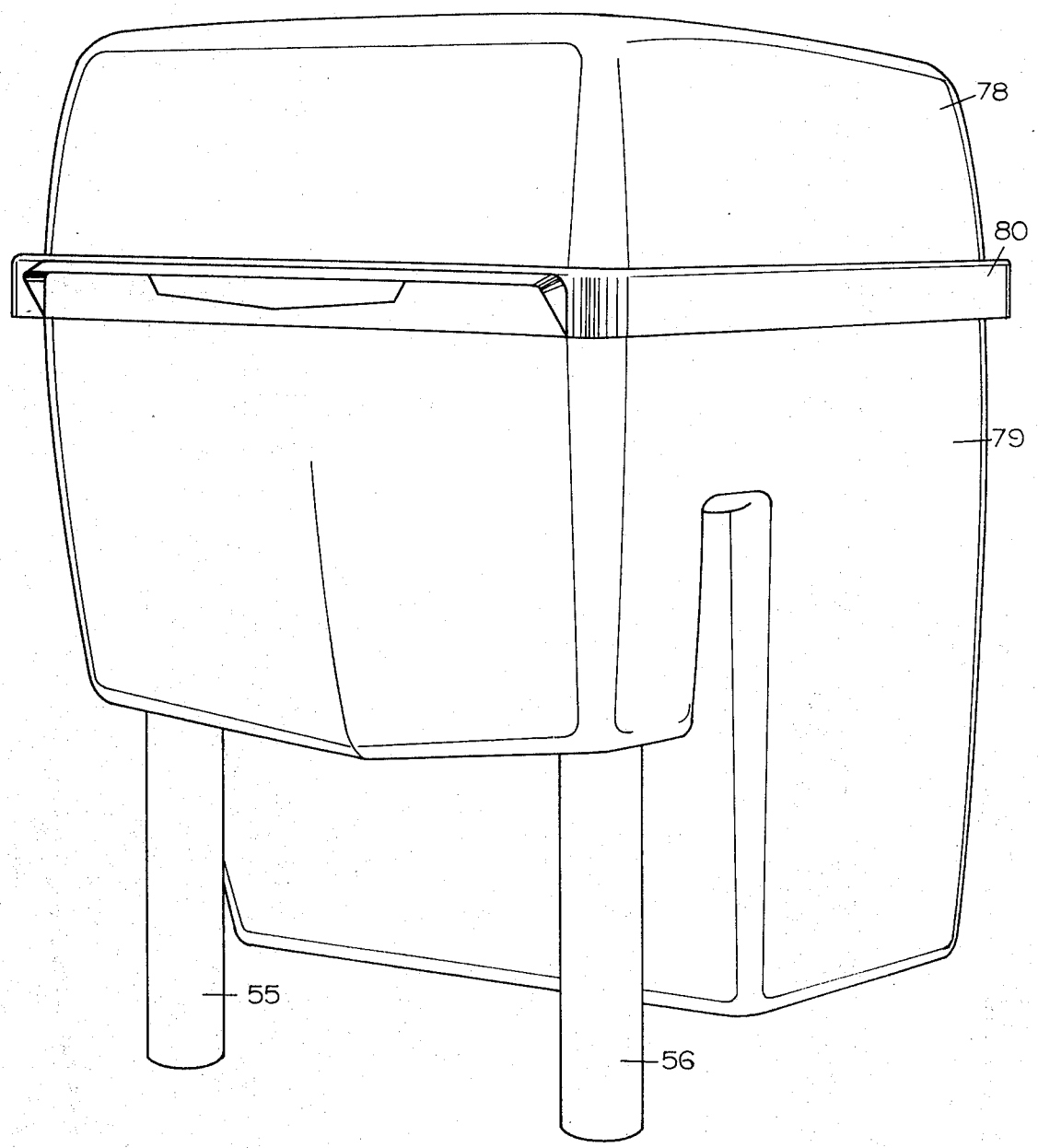
FIG. 9 is an enlarged general perspective view of the device of FIG. 6.

Turning now to FIG. 9 in which the FIG. 6 type of appliance is shown enlarged, the unit is seen as comprising a flanged upper section 78 which rests upon a flanged lower section 79, both of which are made of fiberglass. The upper section's flange is provided with a stainless steel rim or moulding 80 cemented in place so as to reinforce the flange. The water intake pipe 55 and the water outlet pipe 56 were referred to earlier.

Figure 10:
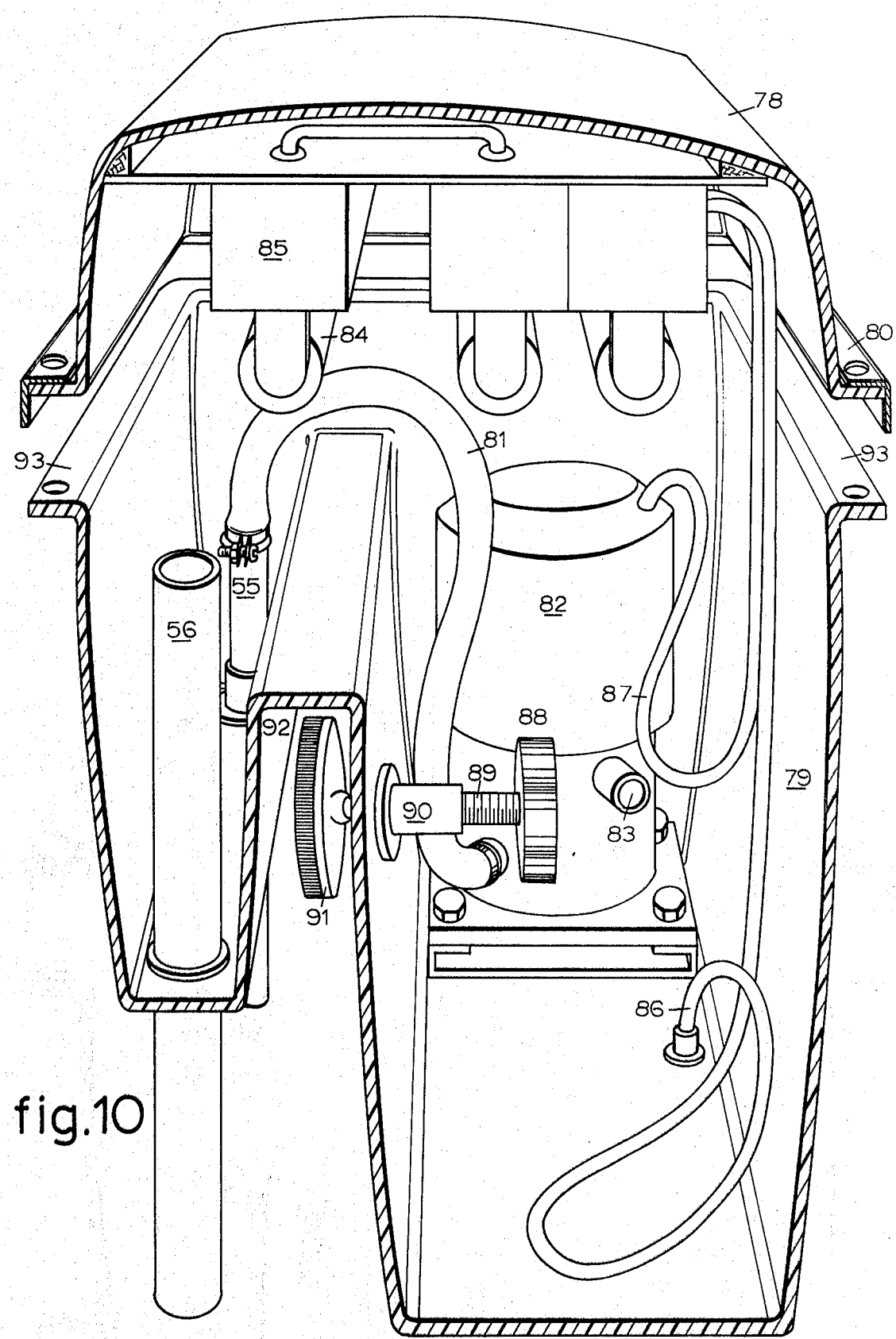
FIG. 10 is a sectional view of the device of FIGS. 6 and 9 affording a view of the interior, and with an upperpart of the appliance in exploded relationship.

In FIG. 10 in which the upper and lower sections are shown separated, we see that to the inside end of the water intake pipe 55 is clamped a flexible hose 81 which leads to a submersible motorized water pump 82 having an outlet spout at 83. Water emerging from the pump fills the lower section 79 to the level of the open upper end of the outlet pipe 56 which rises just above the level of the ridge in the interior of the lower section, the water overflowing the pipe and spilling back into the pool. To the upper section 78 is secured a battery of fluorescent type germicidal lamps, as at 84, which are directly supported by standard rectangular box-shaped fluorescent fixtures, as at 85, in each of which is contained the necessary ballast device for the lamp supported.

Power for the lamps and the pump is brought in through the floor of the lower section by the cord 86 and makes connections inside the lamp fixture at the extreme right hand side of the drawing with the motor cord 87. The fixture referred to is provided with receptacles secured to its wall, into which the cords 86, 87 are connected by means of moisture resistant, screw threaded coupling type plugs (not shown).

The appliance is secured onto the pool by turning the knob 88 which, through the threaded rod 89 that is journaled in the flanged collar 90 drives the rubber surfaced disc 91; the wall of the pool being clamped between disc 91 and the area 92 of the lower section.

The upper section is secured to the lower by means of bolts fastened through the holes in the stainless steel moulding 80 and the flange 93.

The appliance is reasonably safe from tampering by children because of the bolted relationship of the upper and lower sections, and because the clamp cannot be loosened without removing the upper section—which requires the use of a screwdriver.

Figure 11:
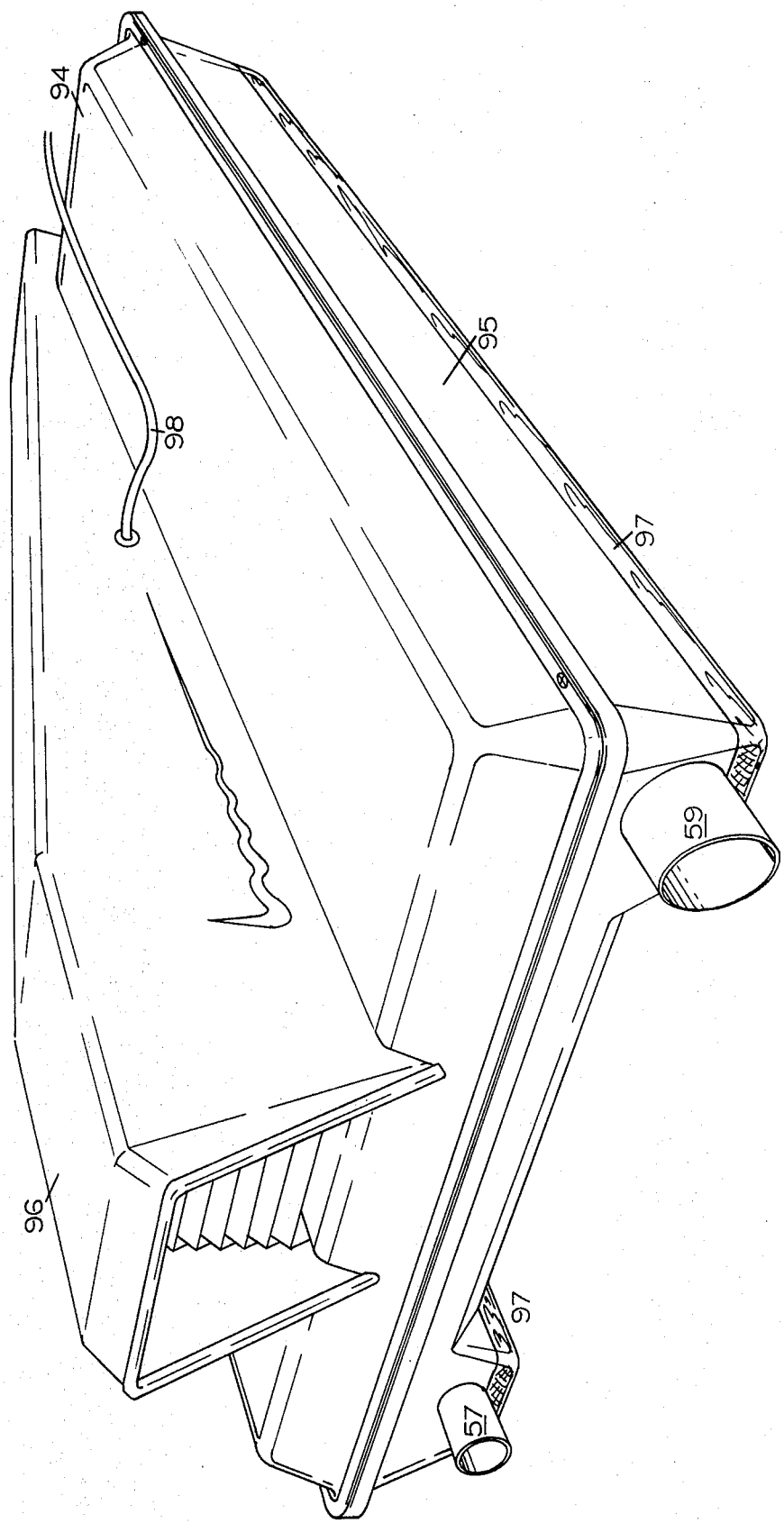
FIG. 11 is an enlarged general perspective view of the device of FIG. 7, FIG. 12 being an additional perspective view of the same showing the lower portion only and partly broken away.

The FIG. 11 unit comprises a fiberglass upper section 94 and a fiberglass lower section 95, the sections having flanged rims, and the upper section is provided with a stainless steel moulding; i.e., the construction is similar to the FIG. 10 device. In additional however, the upper section is provided with a fiberglass superstructure 96 and the lower section is provided with hardwood runners 97 that protect the fiberglass lower section against abrasion damage. From the superstructure emerges a power cord 98 the free end of which is provided with a plug (not shown) for connection with a source of power.

Figure 12:
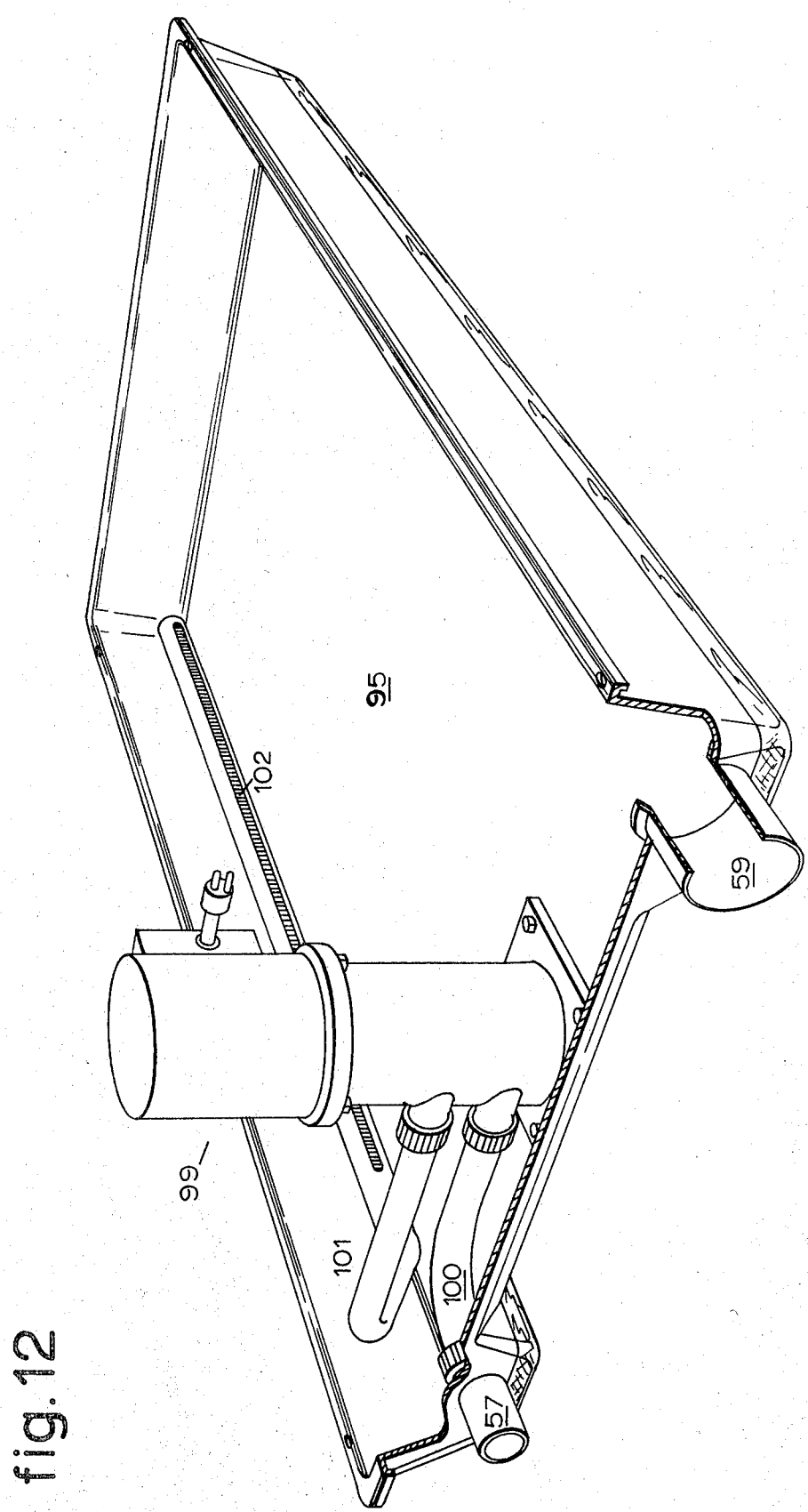

In essence, hte lower section 95 is merely a tub to the floor of which is bolted a motorized water pump, indicated generally as 99, FIG. 12. The water inlet conduit 57—a stainless steel, flange cylinder that is cemented to the wall of the tub, and which is externally threaded at its inboard end—is fitted with a flexible hose for connection with the inlet fitting of the pump. To the outlet fitting of the pump is connected a rigid pipe 101 that is cemented to and lies on the floor of the tub against one wall and is provided with a long slot 102. The far end of the pipe 101 is closed.

In operation, the water drawn in by the pump is forced out through the slot 102 and flows in a sheet across the floor of the tub, spilling out of same through the stainless steel outlet pipe 59.

To the upper section, looking at FIG. 13, is secured a fluoroescent type germicidal lamp 103, for example, the 1,500 watt H23KX lamp made by G.E. It is supported by the electrical terminal elements 104, 105 that depend through openings in the ceiling of the upper section, being bolted to same. On top of the ceiling of the upper is secured the electrical ballast device 106 needed for the lamp. As the specific wiring connections required are well known, they are not shown, but within the superstructure 96, the inboard end of the power cord 98 is connected to the ballast 106 and terminals 104, 105 and is additionally provided with a female receptacle together with flexible cord which is coupled to the motor power plug 107.

The forward end of the superstructure 96 is screened by a louvered partition 108. Air for carrying away the heat generated by the ballast 106 enters the superstructure through the opening 109 at its rearward end and leaves out the louvered forward end; the sloping design of the superstructure contributing to effect the desired airflow.

The superstructure provides a safety shield that prevents persons from touching the hot ballast, and further provides a sun shield that protects the motor 110 from direct exposure to the sun's rays, which might cause the motor to overheat.

I claim:

1. A compact independently operating portable water sterilizer for use fully submerged and in unsecured placement on the floor of a swimming pool, comprising:

a housing structure that is opaque to ultraviolet light and which is divided by a partition into a waterproof electrical compartment and an adjacent irradiation compartment;

said irradiation compartment provided with a water inlet opening and a water outlet opening;

said inlet opening provided with filter means functioning at least as a strainer, and with valve means opening to permit entry of water into the irradiation compartment and closing to prevent escape of water from the irradiation compartment;

said outlet opening provided with valve means opening to permit escape of water from the irradiation compartment and closing to prevent entry of water into the irradiation compartment;

a waterproofed source of ultraviolet light arranged to irradiate water contained in said irradiation compartment and powered by electrical elements located in said electrical compartment;

a flexible waterproof diaphragm secured to said partition and closing an opening provided in the partition, said opening being spaced apart from the location of the source of ultraviolet light;

electrically powered means located in said electrical compartment, so constructed and arranged as to alternately pull and push said diaphragm in such manner that, in effect, the displacement of said irradiation compartment is alternately increased and decreased;

said housing structure provided with a submersible power cord making waterproof connection with and wired to power the electrical elements in said electrical compartment, and, physical ballast means secured to said housing suitable to weight the combination to maintain same in submersion.

2. A compact independently operating portable water sterilizer adapted for use in unsecured placement on a walkway surface adjacent a swimming pool, comprising, where an enclosure is provided that is opaque to germicidal radiation, in which enclosure is provided an irradiation chamber for the containment of water, said chamber having spaced apart water inlet means and water outlet means, and in which enclosure is provided germicidal radiation means arranged to irradiate the interior of said chamber, in combination with same:

said enclosure having a form suitable for stable placement on said walkway surface;

a first length of flexible hose one end of which is connected to said water inlet means externally of said chamber, and the other end of which is free for placement in submersion in said pool;

a second length of flexible hose on end of which is connected to said water outlet means externally of said chamber and the other end of which is free for placement in such proximity to the water in the pool that discharged water is returned to the pool;

a submersible motorized water pump located inside and secured to said irradiation chamber in such arrangement that the water input side of the pump is connected to said inlet means inside said chamber so as to draw water from the pool, and the water output side of the pump opens into the interior of the chamber.

3. A compact independently operating portable water sterilizer adapted for use in a readily removable attached position on an accessible rigid wall member of an above ground swimming pool, comprising, where an enclosure is provided that is opaque to germicidal radiation, in which enclosure is provided an irradiation chamber for the containment of water, said chamber having spaced apart water inlet means and water outlet means, and in which enclosure is provided germicidal radiation means arranged to irradiate the interior of said chamber, in combination with same:

said enclosure provided with means adapted to engage opposed sides of said wall member in a manner suitable to secure said enclosure on an upper edge thereof;

a construction and arrangement of the above recited elements such that when said enclosure is in the installed position on said wall member, an externally located open end of said inlet means is necessarily in submersion in the water in the pool when the water is maintained at a typical level;

a construction and arrangement of the above recited elements such that when said enclosure is in the installed position on said wall member, an externally located open end of said outlet means is necessarily in such proximity to the water in the pool that discharged water is necessarily returned to the pool;

a submersible motorized water pump located inside and secured to said irradiation chamber in such arrangement that the water input side of the pump is connected to said inlet means inside said chamber so as to draw water from the pool, and the water output side of the pump opens into the interior of the chamber.

4. A compact independently operating portable water sterilizer adapted for use in a readily removable attached position on an accessible rigid wall member of an above ground swimming pool, comprising:

an enclosure that is opaque to germicidal radiation, having an upper portion, a lower portion and an intermediate portion;

a horizontally disposed tubular germicidal lamp together with electrical base and ballast means secured in and occpying said upper portion only, said lamp being arranged to irradiate said intermediate and lower portions;

said intermediate and lower portions together comprising a water receptacle in which said lower portion only is filled with water and in which said intermediate porton is unoccupied and is of sufficient height as to minimize the likelihood of water in the lower portion splashing upwardly against said lamp, the lamp being directly exposed to the water such that the effectiveness of the germicidal radiation is diminished only by the air occupying said intermediate portion;

said upper portion comprising a cover member distinct from and adapted to close in a light tight manner the upper end of said water receptacle and provided with means for securing the cover member to the upper end of the water receptacle;

means fixed to said receptacle, adapted to engage opposed sides of a rigid wall member of an above ground swimming pool and so constructed and arranged as to support said water receptacle in use at such elevation that the level of the water in said lower portion is at least as high above the ground as the top edge of said wall member;

said receptacle provided with water inlet means having an externally located open end which is necessarily in submersion in the water in the pool when said receptacle is in the installed position on said wall member and the water in the pool is maintained at a typical level;

a submersible motorized water pump secured inside said lower portion, the latter being deep enough that the pump occupies said lower portion only and is fully submerged when water fills the lower portion, both for pump efficiency and to maximize the effective surface area of irradiated water by allowing water to overlie the pump, the arrangement being such that the water input side of the pump is connected to said inlet means inside said receptacle and the water output side of the pump opens into the interior of the receptacle;

said receptacle provided with water outlet means in said lower portion having an externally located open end which is necessarily in such proximity to the water in the pool when said receptacle is in the installed position on said wall member that discharged water is necessarily returned to the pool, said water outlet means further including an internal tube of given length having an open inside end located in said lower portion at such elevation as to allow water delivered by the output side of the pump to entirely fill said lower portion and at the same time prevent the water from rising above said lower portion by allowing the excess to flow into said open inside end.

5. A compact independently operating portable water sterilizer adapted for use fully submerged and in unsecured placement on the floor of a home acquarium of less than thirty gallons capacity; comprising:

a housing structure that is opaque to germicidal radiation;

a single electrical base means secured inside said housing on one end surface thereof and projecting therefrom and a germicidal lamp secured in said base;

an enclosure made of material transparent to germicidal radiation, encircling said base means and enveloping said lamp and provided with means securing said enclosure to said housing structure in a manner preventing entry of water into said enclosure while providing removability of the enclosure when necessary for replacement of the lamp;

a flexible electrical power cord one end of which is secured to terminals on said base means in a waterproof arrangement and extending therefrom externally of said housing to remote means providing an electrical ballast for said lamp;

physical ballast means for weighting the combination to cause same to rest on the floor of said acquarium;

said housing structure provided with water inlet means suitable to prevent entry of small fishes into the interior of the housing;

air bubble type water lift means including an open ended, upright tubular conduit that is fixed to said housing, the lower end of which conduit opens into the interior of said housing and the upper end of which conduit opens at the exterior of the housing, air inlet conduit means communicating with said upright tubular conduit and having a cooperating nipple located on an external surface of said housing for attachment of an air hose, the combination being so constructed and arranged that pressurized air supplied by the hose necessarily enters said upright tubular conduit, forming bubbles which effect circulation of water in said housing around said enclosure.

6. A combination as recited in claim 5 in which said housing structure is in the form of a single piece generally bell shaped open bottomed shell that is wider at the bottom end than at the top in a draft providing configuration suitable for mold release, and in which said elecrical base means is fixed to and depends from the top end thereof inside the shell.

7. A compact independently operating portable water sterilizer adapted for use in a readily removable attached position on an accessible rigid wall member of a home aquarium, comprising:

an enclosure that is opaque to germicidal radiation, having an upper portion, a lower portion and an intermediate portion;

a germicidal lamp together with electrical base and ballast means secured in and occupying said upper portion only, said lamp being arranged to irradiate said intermediate and lower portions;

said intermediate and lower portions together comprising a water receptacle in which said lower portion only is filled with water and in which said intermediate portion is unoccupied and is of sufficient height as to minimize the likelihood of water in the lower portion splashing upwardly against said lamp, the lamp being directly exposed to the water such that the effectiveness of the germicidal radiation is diminished only by the air occupying said intermediate portion;

said upper portion comprising a cover member distinct from and adapted to close in a light tight manner the upper end of said water receptacle;

means fixed to said receptacle, adapted to engaged opposed sides of a rigid wall member of said acquarium and so constructed and arranged as to support said water receptacle in use at such elevation that the level of the water in said lower portion is at least as high as the top edge of said wall member;

said receptacle provided with a water inlet opening to which is secured an air bubble type water lift device, the combination comprising a generally upright water intake tube the upper end of which is secured to said receptacle in communication with said inlet opening, and which extends therefrom directly into the acquarium, and the lower end of which is free and is in submersion; an air inlet tube one end of which provides attachment means for an air supply hose and the other end of which is in communication with a submerged portion of said intake tube for injection of pressurized air into same, the lowermost end of said intake tube having a restricted opening suitable to prevent entry of small fishes;

said receptacle provided with water outlet means so constructed and arranged that discharged water is necessarily returned to the aquarium.

References Cited

UNITED STATES PATENTS

| | | | |
|---|---|---|---|
| 3,079,498 | 2/1963 | Ruffin | 250—45 |
| 3,134,897 | 5/1964 | Maury | 250—43 |

ARCHIE R. BORCHELT, Primary Examiner

A. L. BIRCH, Assistant Examiner

U.S. Cl. X.R.

21—102; 119—5